No. 809,071. PATENTED JAN. 2, 1906.
P. B. MOTLEY.
MEANS FOR SUPPORTING THE EXPANSION ENDS OF BRIDGES, &c.
APPLICATION FILED MAY 5, 1905.
2 SHEETS—SHEET 1.
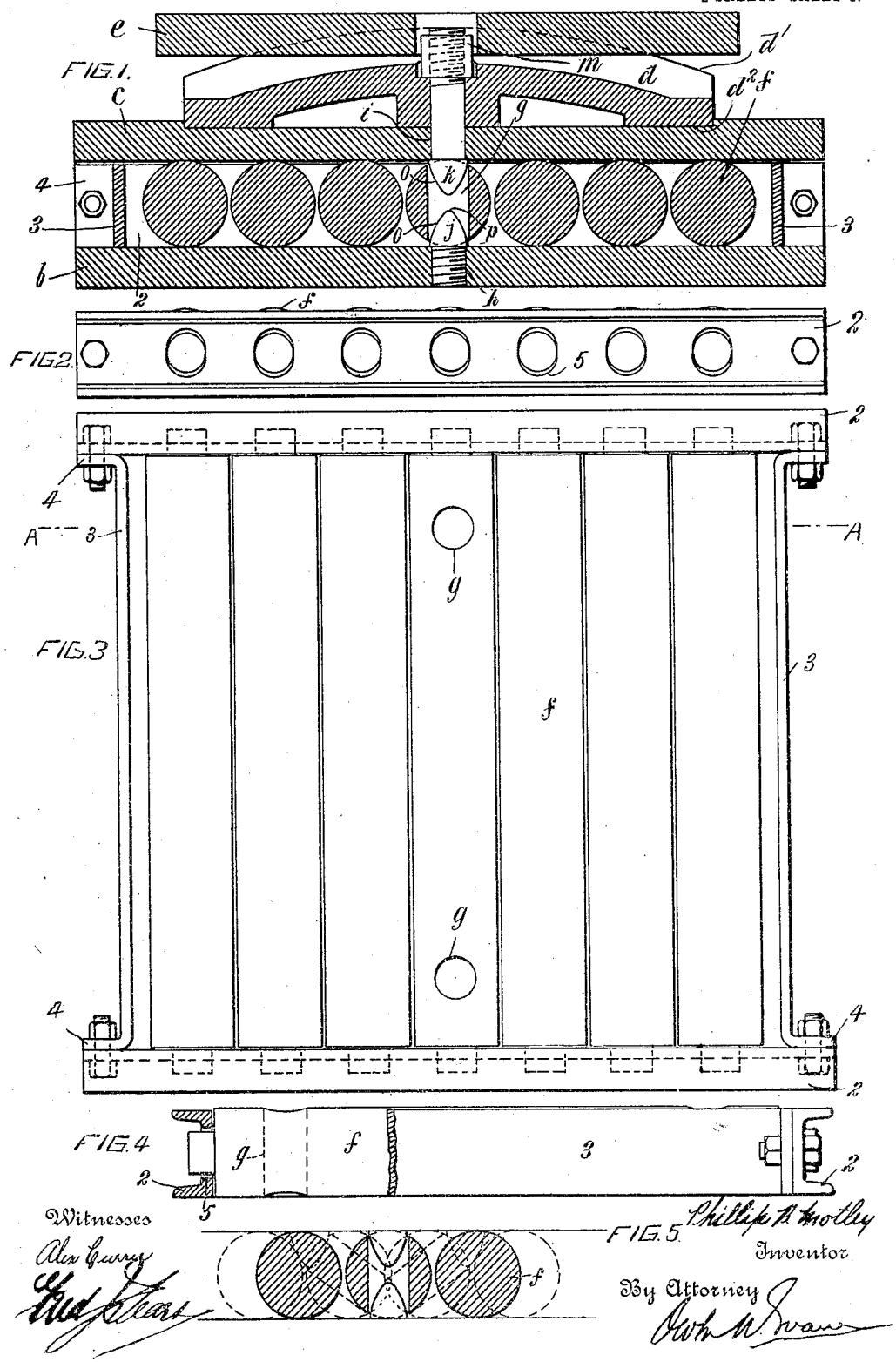

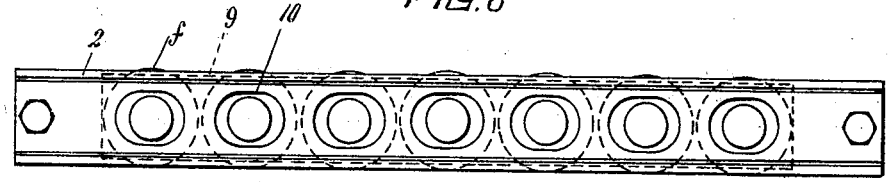
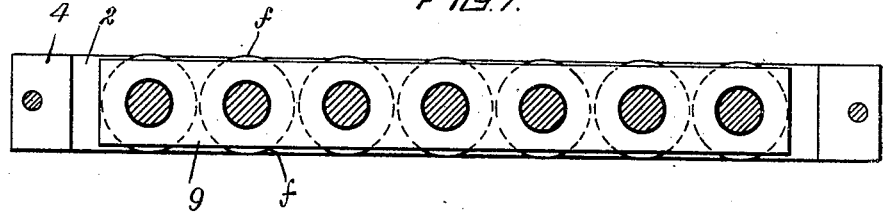
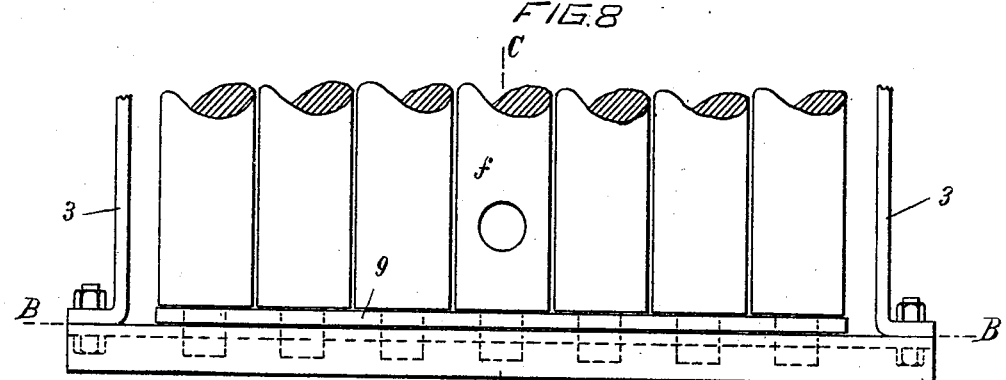
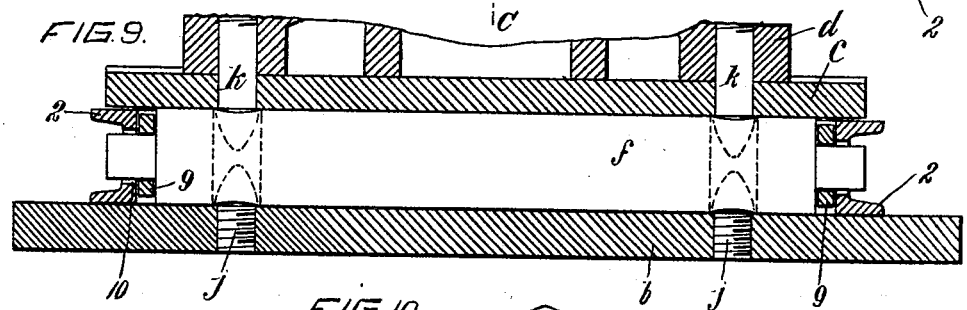
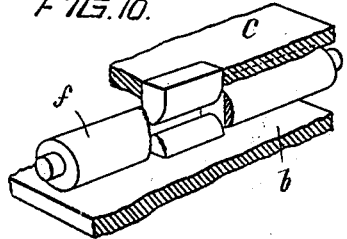

UNITED STATES PATENT OFFICE.

PHILLIPS BATHURST MOTLEY, OF MONTREAL, CANADA.

MEANS FOR SUPPORTING THE EXPANSION ENDS OF BRIDGES, &c.

No. 809,071. Specification of Letters Patent. Patented Jan. 2, 1906.

Application filed May 5, 1905. Serial No. 258,933.

*To all whom it may concern:*

Be it known that I, PHILLIPS BATHURST MOTLEY, of the city of Montreal, Province of Quebec, Canada, have invented certain new and useful Improvements in Means for Supporting the Expansion Ends of Bridges, Roofs, and the Like; and I do hereby declare that the following is a full, clear, and exact description of the same.

My invention relates particularly to the roller-bearing means for accommodating and facilitating the movement of a part due to expansion or contraction; and it has for its object to maintain the nest of rollers constantly at right angles to the predominating line of movement of the part, also to prevent movement of the rollers without a commensurate movement of the part, and vice versa.

The invention may be said, briefly, to consist of a device or a plurality of devices, preferably dowels, in combination with the bearing members, between which are located a nest of rollers adapted to receive the concentrated pressure upon the bearing members, such device or devices being constructed and arranged to effect a sliding connection between the rollers and the said members. The purpose of this sliding connection is to correct a tendency of the rolling member influenced directly thereby to deviate from any position in which it is set, this being effected by the sliding connection constantly maintained between the bearing and rolling members.

More specifically speaking, the invention may be said to consist of a pair of dowels carried by one of the bearing members and projecting into holes in one of the rollers near the opposite ends of the latter, the dowels and holes being preferably of circular cross-section and such dowels being of truncated conoidal formation and preferably cycloidal in their longitudinal direction.

A further feature of my invention consists of a dust-guard of particular construction and specially adapted for use in connection with roller-bearing mechanism above mentioned, and such dust-guard consists of an open frame inclosing the nest of rollers and adapted to lie freely between the bearing members and make as close a seal as possible between them for the purpose of excluding foreign particles.

For full comprehension, however, of my invention reference must be had to the accompanying drawings, forming a part of this specification, in which similar reference characters indicate the same parts, and wherein—

Figure 1 is a sectional view illustrating my invention applied to the pier members of a bridge, the view being taken on line A A, Fig. 3. Fig. 2 is an elevation of the rollers and inclosing frame looking toward the ends of the rollers. Fig. 3 is a plan view with the roller-plate and the parts above it removed. Fig. 4 is a side elevation, partly in vertical section, of the parts illustrated in Fig. 3. Fig. 5 is an enlarged sectional view of the middle roller of the nest and that on each side thereof and my improved dowel. Fig. 6 is an end elevation illustrating a modified form of dust-guard. Fig. 7 is a sectional view taken on line B B, Fig. 8. Fig. 8 is a plan view of the embodiment of a portion of my improved bearing illustrated in Figs. 7 and 8. Fig. 9 is a vertical sectional view taken axially through the middle roller. Fig. 10 is a perspective sectional view of a modification of my improved dowel illustrated.

In order that my invention may be clearly understood, I have illustrated the same applied to the pier members of a bridge, although it may be applied to advantage in any structure requiring an antifriction-bearing with limited movement.

The roller-bed plate $b$, roller-plate $c$, and shoe-plate $e$ are of the usual construction employed in bridge-building and will not be described in detail herein.

The nest of rollers $f$ are in the main of the usual solid cylindrical form. My improved devices for effecting a sliding connection between the rollers and bearing members on each side thereof (the roller-bed plate and roller-plate in this instance) consists of the following construction: The middle roller preferably is formed with a pair of diametric holes $g$ in the same axial plane relatively to the roller and located, preferably, one near each end thereof, and the roller-bed plate $b$ and roller-plate $c$ are bored, as at $h$ and $i$, respectively. Two pairs of dowels $j$ and $k$ are set in the borings $h$ and $i$, the dowels $j$ being preferably threaded into the borings $h$, which are tapped for the purpose, while the dowels $k$ are preferably of greater length and extend through holes in a disk $d$, having a curved upper surface $d'$ and a flat under surface $d^2$, the latter being adapted to rest in a recess in the top of the roller-plate $c$, while the shoe-plate, resting upon the curved top $d'$, is correspondingly curved to effect a universal joint. The dowels $k$ are secured in place by nuts $m$, screwed upon their upper ends, which are screw-threaded. The shoe-plate is bored to accommodate the nuts, thereby effecting a connection between the shoe-plate and the roller-bed plate through the medium of the dowel *k*, the roller with which they engage, and the dowels *j* in the roller-bed plate and maintaining constantly the same relative transverse position of the pier members. The protruding portion of the dowels is of truncated conoidal form, the sides or perimeters *o* of each being preferably of cycloidal formation in their longitudinal direction, while their ends *p* are preferably rounded. The distance from center to center of the rollers and the dimensions of the dowels are preferably such that the cycloidal surface *o* at one side of the perimeter of each dowel of the forward pair (the direction of movement of the rollers being considered) will impinge against the roller in advance thereof before the ends of such dowels leave the holes in the rollers, and the cycloidal surface at the opposite side of the perimeter of the other dowels will be impinged against by the roller following it. The rollers are preferably positioned in this relation by two of the members of a dust-guard, to be presently described. The construction as thus far described provides the means, before mentioned, for effecting a sliding contact between the rollers and bearing members.

Under certain circumstances either the upper or lower pair of dowels can be dispensed with and the other pair will serve the purpose to advantage, or if the movement of a nest of bars or short rollers is to be governed a single dowel, whether of conoidal pin form or a plate of tapered cross-section with cycloidal inclined surfaces, as shown in Fig. 10, may be utilized.

It is a well-known fact that great damage to roller-bearings is due to the admission of dust, cinders, and the like thereto, which obstructs the movement of the rollers, and therefore destroys their efficiency. To obviate this, I have devised what may be termed a "floating" dust-guard adapted to completely encircle the nest of rollers. This dust-guard consists, preferably, of a rectangular frame composed of a pair of bars 2 of channel cross-section and a pair of flat bars 3, having their ends bent, as at 4, and bolted to the ends of the channel-bars 2, while the webs of the channel-bars are preferably vertically slotted, as at 5, to allow of a limited amount of play of the dust-guard between the bearing-surfaces while spacing the rollers as required. This frame is slightly less in height than the diameters of the rollers to provide a clearance to allow of free movement between it and the bearing members without admitting dust to the rollers, and it is free to move in either direction with the rollers.

Under certain circumstances spacer-bars 9 are utilized. They are located between the channel-bars and the ends of the rollers, and the channel-bars are formed with holes 10, each elongated in a longitudinal plane to allow of less than the maximum movement of the rollers with one of the bearing members without disturbing the frame. When one of the bearing members, and with it the rollers, move a greater distance in either direction than provided for by the slots 5 in the channel members of the frame, the dust-guard frame will accompany them. In the case of bridges the length of the slots 5 is sufficient to accommodate anything but abnormal expansion and contraction, which is taken care of by the freedom of the guard to be displaced in either direction.

What I claim is as follows:

1. The combination with a pair of bearing members, having a nest of rollers between them, of means effecting a sliding connection between such bearing members and rollers for the purpose of correcting any tendency of the rollers to deviate from any position with their axes at right angles to their plane of travel.

2. The combination with a pair of bearing members, having a nest of rollers between them, of means effecting a sliding connection between such bearing members and rollers for the purpose of correcting any tendency of the rollers to deviate from any position with their axes at right angles to their plane of travel, and such means limiting the extent of movement of such parts relatively to one another.

3. The combination with a pair of bearing members having a rolling member between them, of means carried by one of such members and effecting a sliding engagement with a member next to it for the purpose of maintaining the members constantly in the same relation.

4. The combination with a pair of bearing members having a rolling member between them, of means carried by one of such bearing members and effecting a sliding engagement with the rolling member for the purpose of maintaining the members constantly in the same relation.

5. The combination with a pair of bearing members having a rolling member between them, one of such members having a hole therein presenting a face with which one of the faces of a projection carried by another of the members makes sliding contact for the purpose of maintaining the members constantly in the same relation.

6. The combination with a pair of bearing members having a rolling member between them, one of such members having a hole therein presenting a face with which one of the faces of a projection carried by another of the members makes sliding contact for the purpose of maintaining the members constantly in the same relation one of such faces being of cycloidal formation.

7. The combination with a pair of bearing members having a rolling member between them, one of such members having a hole therein presenting a face with which one of the faces of a projection carried by another of the members makes sliding contact for the purpose of maintaining the members constantly in the same relation, the contacting face of the projection being of cycloidal formation.

8. The combination with a pair of bearing members having a nest of rollers between them, and means for spacing such rollers, of a device carried by one of the bearing members and presenting a face adapted to make sliding contact with the face presented by one of the walls of a hole in the perimeter of one of the rollers for the purpose of maintaining the bearing members and rollers constantly in the same relation.

9. The combination with a pair of bearing members having a nest of rollers between them, and means for spacing such rollers, of a device carried by one of the bearing members and presenting a face adapted to make sliding contact with the face presented by one of the walls of a hole in the perimeter of one of the rollers for the purpose of maintaining the bearing members and rollers constantly in the same relation, one of such faces being of cycloidal formation.

10. The combination with a pair of bearing members having a nest of rollers between them, and means for spacing such rollers, of a device carried by one of the bearing members and presenting a face adapted to make sliding contact with the face presented by one of the walls of a hole in the perimeter of one of the rollers for the purpose of maintaining the bearing members and rollers constantly in the same relation, the contacting face of the device being of cycloidal formation.

11. The combination with a pair of bearing members, having a nest of rollers between them one of such rollers having a pair of holes in the perimeter thereof one near each end, and means for spacing such rollers, of a pair of conoidal dowels carried by one of the bearing members and projecting into the holes in the roller.

12. The combination with a pair of bearing members, having a nest of rollers between them one of such rollers having a pair of holes in the perimeter thereof one near each end, and means for spacing such rollers, of a pair of dowels carried by one of the bearing members and projecting into the holes in the roller, such dowels being of conoidal formation and cycloidal in axial direction.

13. The combination with a pair of bearing members, having a nest of rollers between them one of such rollers having a pair of holes extending diametrically therethrough one near each end, and means for spacing such rollers, of a pair of conoidal dowels carried by one of the bearing members and projecting into the adjacent ends of the holes in the roller, and a second pair of dowels carried by the other bearing member and projecting into the opposite ends of the holes.

14. The combination with a pair of bearing members, having a nest of rollers between them one of such rollers having a pair of holes extending diametrically therethrough one near each end, and means for spacing such rollers, of a pair of dowels carried by one of the bearing members and projecting into the adjacent ends of the holes in the roller, and a second pair of dowels carried by the other bearing members and projecting into the opposite ends of the holes, such dowels being of conoidal formation and cycloidal in axial direction.

15. The combination with a pair of bearing members having a roller-bearing between them, of a dust-guard fitting closely between the bearing members and encircling the roller-bearing, one of the bearing members being movable relatively to the dust-guard, and the said dust-guard being free to move independently of both bearing members.

16. The combination with a pair of bearing members having a roller-bearing between them, of a rectangular dust-guard fitting closely between the bearing members and encircling the roller-bearing, one of the bearing members being movable relatively to the dust-guard and the said dust-guard being free to move independently of both bearing members.

17. The combination with a pair of bearing members having a roller-bearing between them, of a rectangular dust-guard free of and fitting closely between the bearing members and encircling the roller-bearing, such dust-guard consisting of a pair of parallel bars of channel cross-section, and a pair of bars having their ends secured rigidly to the ends of the channel-bars, such bars being slightly less in height than the distance between the bearing members.

18. The combination with a pair of bearing members having between them a nest of rollers with their ends diminished, of a rectangular dust-guard free of and fitting closely between the bearing members and encircling the rollers, such dust-guard consisting of a pair of parallel bars of channel cross-section formed with openings through which the diminished ends of the rollers project, and a pair of flat bars having their ends bent at right angles and secured rigidly to the ends of the channel-bars, such bars being slightly less in height than the distance between the bearing members.

19. The combination with a pair of bearing members having between them a nest of rollers with their ends diminished, of a dust-guard fitting closely between the bearing members and consisting of a pair of parallel bars of channel cross-section formed with holes through which the diminished ends of the rollers project, such holes being of sufficient dimensions to allow of limited play of the guard between the bearing members, and means securing the bars against axial movement relatively to the rollers, the channel-bars being slightly less in height than the distance between the bearing members and the said dust-guard being free to move independently of both bearing members.

20. The combination with a pair of bearing members having, between them, a nest of rollers with their ends diminished, of a rectangular dust-guard free of and fitting closely between the bearing members and encircling the rollers such dust-guard consisting of a pair of parallel bars of channel cross-section formed with holes through which the diminished ends of the rollers project such holes being of sufficient dimensions to allow of limited play of the guard between the bearing members and a pair of bars having their ends secured rigidly to the ends of the channel-bars, such bars being slightly less in height than the distance between the bearing members.

21. The combination with a pair of bearing members having, between them, a nest of rollers with their ends diminished, of spacer-bars at the opposite ends of the rollers and having holes fitting closely upon the diminished ends of the rollers, a rectangular dust-guard free of and fitting closely between the bearing members and encircling the rollers and the spacer-bars, such dust-guard consisting of a pair of parallel bars of channel cross-section formed with longitudinal slots, through which the diminished ends of the rollers project, and a pair of bars having their ends secured rigidly to the ends of the slotted bars, such bars being slightly less in height than the distance between the bearing members.

In testimony whereof I have signed my name to this specification in the presence of two subscribing witnesses.

PHILLIPS BATHURST MOTLEY.

Witnesses:
WILLIAM P. McFEAT,
FRED. J. SEARS.